United States Patent
Yang et al.

(10) Patent No.: US 10,040,966 B2
(45) Date of Patent: Aug. 7, 2018

(54) AQUEOUS PAINT COMPOSITIONS WITH SOFT FEEL AND LIGHT DIFFUSION EFFECTS

(71) Applicant: Columbia Insurance Company, Omaha, NE (US)

(72) Inventors: Yong Yang, Hillsborough, NJ (US); Glenn Cooper, East Hanover, NJ (US); Robert Sheerin, North Caldwell, NJ (US); Johanna Garcia, Lake Hopatcong, NJ (US); Clarena Shavel, East Stroudsburg, PA (US)

(73) Assignee: Columbia Insurance Company, Omaha, NE (US)

( * ) Notice: Subject to any disclaimer, the term of this patent is extended or adjusted under 35 U.S.C. 154(b) by 11 days.

(21) Appl. No.: 15/147,938

(22) Filed: May 6, 2016

(65) Prior Publication Data
US 2017/0321078 A1     Nov. 9, 2017

(51) Int. Cl.
| | |
|---|---|
| *C09D 139/08* | (2006.01) |
| *C09D 133/08* | (2006.01) |
| *C09D 5/02* | (2006.01) |
| *C09D 133/14* | (2006.01) |
| *C09D 7/65* | (2018.01) |
| *C09D 7/40* | (2018.01) |
| *C08L 75/04* | (2006.01) |

(52) U.S. Cl.
CPC .............. *C09D 133/08* (2013.01); *C09D 5/02* (2013.01); *C09D 5/024* (2013.01); *C09D 7/65* (2018.01); *C09D 7/69* (2018.01); *C09D 133/14* (2013.01); *C08L 75/04* (2013.01)

(58) Field of Classification Search
CPC ........ C09D 5/02; C09D 7/125; C09D 7/1283; C09D 133/08
See application file for complete search history.

(56) References Cited

U.S. PATENT DOCUMENTS

| | | | |
|---|---|---|---|
| 6,228,935 B1 | 5/2001 | Dunaway et al. | |
| 6,410,626 B1 | 6/2002 | Wada et al. | |
| 6,835,772 B2 | 12/2004 | Kita et al. | |
| 7,829,626 B2 | 11/2010 | Chiou et al. | |
| 8,900,669 B2 | 12/2014 | LaFleur et al. | |
| 2009/0171005 A1 | 7/2009 | Finegan et al. | |
| 2011/0160379 A1 | 6/2011 | Buettner et al. | |
| 2012/0165428 A1 | 6/2012 | Tilara et al. | |
| 2013/0302624 A1 | 11/2013 | Munzmay | |
| 2014/0228509 A1 | 8/2014 | Yang et al. | |
| 2014/0275394 A1 | 9/2014 | Allen | |

FOREIGN PATENT DOCUMENTS

| | | |
|---|---|---|
| CN | 1605608 | 4/2005 |
| CN | 102408805 | 4/2012 |
| EP | 1958995 A2 | 8/2008 |
| GB | 2362387 A | 11/2001 |
| TW | I1284141 B | 7/2007 |
| WO | 2013123357 A1 | 8/2013 |

OTHER PUBLICATIONS

International Search Report and Written Opinion issued in connection with the corresponding International Application No. PCT/US2017/030074 dated Jul. 27, 2017.
Bibliographic data for CN 1605608 A to Huang.
Translation of CN 102408805 to Zonglin.
Korean Patent Abstract for KR 1020080008522 A to Lee et al.
Petrova, E.V. et al. "Investigation of Coatings Prepared from Polymer with Low Glass Transition Temperature". Nov. 25-27, 2008. Warsaw, Poland. Paper No. 52.
Translated Abstract of TW I1284141 to Lee et al.

*Primary Examiner* — Edward J Cain
(74) *Attorney, Agent, or Firm* — The H.T. Than Law Group

(57) ABSTRACT

The present invention is directed to an aqueous architectural composition comprising a low Tg (less than about −10° C. and higher than about −50° C.) acrylic emulsion polymer with at least one cross-linkable moiety, and solid polyutherane (PU) or polybutylacrylate microspheres having a mean weight diameter of less than about 40 microns and a Tg of less than about 0° C., wherein the solid PU spheres make up about 10% to about 20% by weight of the composition. The solid acrylic polymer without water and the PU spheres make up about 30% to about 40% by weight of the aqueous composition. A dried paint film formed by the inventive aqueous architectural composition can withstand at least about 500 cycles on the scrub test, and a gloss value at 60° of less than about 2.5 GU.

24 Claims, No Drawings

AQUEOUS PAINT COMPOSITIONS WITH SOFT FEEL AND LIGHT DIFFUSION EFFECTS

FIELD OF THE INVENTION

This invention generally relates to aqueous architectural compositions that produce dried films or coatings with a soft feel and light diffusion effects.

BACKGROUND OF THE INVENTION

Commercial soft feel coatings have been used as industrial coatings in the automotive, computer hardware and printing industries to cover inexpensive plastic parts to give them a pleasing soft feel. These conventional soft feel coatings are generally made from multi-component soft polyurethane resins. The liquid components, generally two or more, are mixed together prior to their application on to the surfaces to cross-link, typically with heat, to form a film on the surfaces. Without cross-linking of the components, the coatings would have poor durability such as scrubability, burnishing resistance, and inferior water resistance and water staining resistance.

Heretofore, commercial soft feel coatings have been somewhat limited to industrial coatings, but have not been widely used in the architectural coatings, such as paints, primers and stains for buildings and dwellings. Architectural coatings are general one-pack, i.e., no mixing is required prior to application of the coating to walls or floors, and architectural coatings are dried or cross-linked at ambient conditions.

The patent literature contains a number of related coating references, CN 1 605 608 (Abstract) discloses colorful suede paint comprising acrylic copolymer emulsion with spherical color polyurethane powder. GB 2 362 387 discloses an aqueous multi-polymer dispersion comprising a soft acrylic polymer (Tg from −70° C. to 19° C.), a hard acrylic polymer (Tg from 40° C. to 115° C.) and polyurethane particles having a weight average diameter (Dw) from 20 nm (or $20\times10^{-9}$ m) to 200 nm. U.S. Pat. No. 6,835,772 discloses a low temperature curing, soft feel coating composition comprising a polyester or polyester resins (Tg from −30° C. to −70° C.) and lanolin-deposited polyurethane fine particles or clay particles (5 to 40 microns).

U.S. Pat. No. 8,900,669 discloses a clear matte coating having a first polymer (Tg from −60° C. to 100° C.) of 10% to 65% wt., a second particulate (0.5 to 30 μm, Tg from −60° C. to 150° C.) of 10% to 80% wt., and 0.1% to 15% wt. of aminosilane. The first polymer can be acrylic or urethane among other polymers, and the second particulates can be acrylic. U.S. Pat. No. 7,829,626 discloses another an aqueous matte coating having a binder component and a polymeric "duller" component. The duller component can be multi-stage or single stage cross-linked acrylic particles with diameter of 1-20 μm. Preferably, the duller particles are acrylic, vinyl, rubber or urethane (Tg from −60° C. to 75 C). The binder component can be acrylic, vinyl, polyurethane or siloxane having Mw from 200,000 to 10,000,000 for leather and paper applications and Mw of from 10,000 up to 1,000,000 and Tg from 20° C. to 70° C. for architectural coatings.

WO 2013/123357 discloses an aqueous dispersion comprising polyurethane particles (resin) and pigments partially or fully encapsulated with a soft polymer (acrylic, styrene-acrylic or vinyl acrylic with Tg<35° C.). KR 2008 0008522 discloses a coating composition with 10-25% wt. of polyurethane resin, 20-25% wt. of polyethylene resin and 5-7% of acrylic beads (5-8 microns).

In many of these patent references, the small particles or particulates in the aqueous compositions are matting or dulling agents, used to reduce the gloss or sheen of the coating. The small particulates can also be silica as discussed in Petrova et al, "Investigation of Coating Prepared from Polymer with Low Glass Transition Temperature," Paper No. 52, Advances in Coatings Technology, Nov. 25-27, 2008, Warsaw, Poland.

There remains a need for durable architectural coatings that don't require mixing prior to application on a substrate with good mechanical properties that exhibit soft feel and light diffusion properties.

SUMMARY OF THE INVENTION

The present invention is directed to an aqueous architectural composition comprising an substantially acrylic emulsion polymer wherein the acrylic monomers forming the polymer have a Tg of less than about −10° C. and higher than about −50° C., wherein the acrylic emulsion polymer comprises at least one cross-linkable moiety;

a plurality of solid polyutherane (PU) spheres having a mean weight diameter of less than about 40 microns and a Tg of less than about 0° C., wherein the solid PU spheres make up about 10% to about 20% by weight of the composition; and a sufficient amount of cross-linking agent in the aqueous phase of the composition cross-link with the at least one cross-linkable moiety.

Preferably, the acrylic polymer without water and the PU spheres make up about 30% to about 40% by weight of the aqueous composition, and preferably the solid PU spheres make up about 12% to about 19% or about 14% to about 18% by weight of the aqueous composition. The Tg of the substantially acrylic emulsion polymer can be less than about −15° C., or less than about −20° C. or less than about −25° C.

Preferably, the mean weight diameter of the PU spheres is from about 5 microns to about 20 microns, or from about 7 microns to about 17 microns. In another embodiment, the mean weight diameter of the PU spheres is about 20 microns to about 40 microns, or from about 25 microns to about 35 microns. In another embodiment, the mean weight diameter of the PU spheres comprises a first mean weight average diameter from about 5 microns to about 15 microns, and a second mean weight average diameter from about 25 microns to about 35 microns.

Preferably, the Ratio of the Microspheres to Acrylic Film-Forming Polymer is from about 0.6 to about 1.4, more preferably from about 0.7 to about 1.3 or from about 0.8 to about 1.25.

In another embodiment, the substantially acrylic emulsion polymer comprises a polymerizable polyethylene glycol monomer or a polymerizable polypropylene glycol monomer, or preferably a methoxy polyethylene glycol methacrylate monomer.

In one embodiment, the substantially acrylic emulsion polymer is selected from a group consisting of butyl acrylic and methyl methacrylate; butyl acrylic, 2-ethylhexyl acrylate and methyl methacrylate, and 2-ethylhexyl acrylate and methyl methacrylate.

In another embodiment, the at least one cross-linkable moiety comprises a diacetone acrylamide ("DAAM") monomer, a diacetone methacrylamide (DAMAM) monomer, an acetoacetoxyethyl methacrylate (AAEM) monomer or an allyl methyl acrylate (AMA) monomer. The cross-linking agent in the aqueous phase of the composition can be adipic acid dihydrazide ("ADH") or a blocked version thereof, such as a hydrazone or a blocked hydrazine. A sufficient amount of cross-linking agent to cross-link with the at least one cross-linkable moiety comprises at least a stoichiometric amount.

In another embodiment, a dried paint film formed by the inventive aqueous architectural composition can withstand at least about 500 cycles on the scrub test.

In yet another embodiment, a dried paint film formed by the aqueous architectural composition has a gloss value at 60° of less than about 2.5 GU.

DETAILED DESCRIPTION OF THE PREFERRED EMBODIMENTS

The present invention is directed to an aqueous emulsion latex dispersion or composition having a soft, self-crosslinkable latex resin with a crosslinkable moiety, a free crosslinking agent in the aqueous dispersion and at least one additive of small polyurethane particles in the aqueous dispersion. The soft latex resin has a glass transition temperature (Tg) of less than about −10° C., preferably less than about −15° C. and more preferably less than about −20° C. or less than about −25° C. Tg for the soft latex resin should be higher than about −50° C. The Tg can be any low value, so long as cross-linking occurs. The Tg can be as low as practicable as long as the crosslinking of the latex particles at ambient conditions can occur to form paint film.

The polyurethane particle additive preferably has a mean weight diameter (Dw) from about 1 micron to about 40 microns, preferably from about 5 microns to about 25 microns, preferably from about 7 microns to about 20 microns or from about 7 microns to about 1.5 microns, and a Tg of less than about 0° C., preferably less than about −10° C. or less than about −15° C. and more preferably less than about −20° C. The PU particles can also be from about 20 microns to about 40 microns and preferably from about 25 microns to about 35 microns and a Tg of less than about 0° C., preferably less than about −10° C. or less than about −15° C. and more preferably less than about −20° C. Preferably, the polyurethane particles comprise multiple average diameters, e.g., a first set of particles from about 5 microns to about 15 microns, and a second set of particles from about 20 microns to about 40 microns or about 25 microns to about 35 microns. In other words, the preferred film forming monomers as well as the microspheres are preferably soft monomers.

Alternatively, polyacrylate microspheres or silicone elastomeric microspheres having substantially similar or the same average diameters and Tg can replace the PU microspheres.

Tg is preferably determined by the Fox equation. When the polymers are copolymers, the overall $T_g$ of a particular layer of copolymers can be calculated by applying the $T_g$ value of the homopolymer derived from each monomer to the Fox Equation:

$$(1/T_g)=(W_a/T_{ga})+(W_b/T_{gb})+ \ldots +(W_i/T_{gi}), \text{ wherein}$$

$W_1, W_2, \ldots$ and $W_i$=weight percentages of monomers "a", "b", and "i"

$T_{ga}, T_{gb} \ldots$ and $T_{gi}=T_g$ values of monomers "a", "b", . . . , and "i"

See U.S. Pat. No. 6,723,779 and International Publication No. WO 94/04581 for the application of the Fox Equation to the calculation of the Tg values of copolymers; see also any edition of the Polymer Handbook such as the $3^{rd}$ ed. (1989). The disclosures of the '779 patent and the '581 publication and of the Polymer Handbook are incorporated herein by reference in their entireties. Alternatively, $T_g$ values can be measured using the differential scanning calorimetry (DSC) technique, or other known techniques. In general, the Tg is influenced by the types of monomers used within a polymer and thus although the polymers of the core and shell have similar average molecular weights their Tg's can be different. Unless otherwise specified Tg are determined by the Fox equation.

Suitable emulsion latex particles include but are not limited to acrylic, vinyl, vinyl-acrylic or styrene-acrylic polymers or copolymers. The latex particles coalesce and/or crosslink to form a paint film on a substrate. Acrylic latexes made principally from acrylic monomers are preferred for the present invention. Exemplary, non-limiting monomers suitable to form the emulsion latex particles for the present invention are described below.

Any acrylic monomers can be used in the present invention. Suitable acrylic monomers include, but are not limited to methyl acrylate, ethyl acrylate, methyl methacrylate, and ethyl methacrylate, butyl acrylate and butyl methacrylate, iso-octyl methacrylate and acrylate, lauryl acrylate and lauryl methacrylate, 2-ethyl hexyl acrylate, stearyl acrylate and methacrylate, isobornyl acrylate and methacrylate, methoxy ethyl acrylate and methacrylate, 2-ethyoxy ethyl acrylate and methacrylate, 2-hydroxyethyl acrylate, 2-hydroxybutyl, dimethylamino ethyl acrylate and methacrylate, acrylates, alkyl(meth) acrylic acids such as methyl acrylic acids, wet adhesion monomers, such as N-(2-methacroyloxyethyl)ethylene urea, and multifunctional monomers such as divinyl benzene, diacrylates, for crosslinking functions etc., acrylic acids, ionic acrylate salts, alkacrylic acids, ionic alkacrylate salts, haloacrylic acids, ionic haloacrylate salts, acrylamides, alkacrylamides, monoalkyl acrylamides, monoalkyl alkacrylamides, alkyl acrylates, alkyl alkacrylates, acrylonitrile, alkacrylonitriles, dialkyl acrylamides, dialkyl alkacrylamides, hydroxyalkyl acrylates, hydroxyalkyl alkacrylates, only partially esterified acrylate esters of alkylene glycols, only partially esterified acrylate esters of non-polymeric polyhydroxy compounds like glycerol, only partially esterified acrylate esters of polymeric polyhydroxy compounds, and combinations thereof. The alkyl methacrylate monomer is preferably methyl methacrylate.

Preferred monomers containing aromatic groups are styrene and α-methylstyrene. Other suitable monomers containing aromatic groups include, but are not limited to, 2,4-diphenyl-4-methyl-1-pentene, 2,4-dimethylstyrene, 2,4,6-trimethylstyrene, 2,3,4,5,6-pentafluorostyrene, (vinylbenzyl)trimethylammonium chloride, 2,6-dichlorostyrene, 2-fluorostyrene, isopropenylaniline, 3(trifluoromethyl)styrene, 3-fluorostyrene, α-methylstyrene, 3-vinylbenzoic acid, 4-vinylbenzyl chloride, α-bromostyrene, 9-vinylanthracene, and combinations thereof.

Preferred monomers containing primary amide groups are methacrylamide, and acrylamide. Other suitable monomers containing amide groups include, but are not limited to, N-vinylformamide, or any vinyl amide, N,N-dimethylacrylamide, N-(1,1-dimethyl-3-oxobutyl)(meth)acrylamide, N-(hydroxymethyl)(meth)acrylamide, N-(3-methoxypropyl)acrylamide, N-(butoxymethyl)acrylamide, N-(isobutoxymethyl)acryl(methacryl)amide, N-[tris(hydroxymethyl) methyl]acryl(methacryl)amide, 7-[4-(trifluoromethyl) coumarin]meth)acrylamide, 3-(3-fluorophenyl)-2-propenamide, 3-(4-methylphenyl)acrylamide, N-(tert-butyl)

(meth)acrylamide, and combinations thereof. These monomers can be polymerized with acrylic monomers, listed above. General formula for vinyl(form)amides:

and (meth)acrylamides:

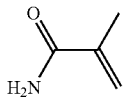

where R1 is H, $CH_3$, $CH_2CH_3$, or other substituted functional groups, and R2 can be —H, —$CH_3$, —$CH_2CH_3$, and other substituted organic functional groups.

In one embodiment, styrene monomers, such as styrene, methylstyrene, chlorostyrene, methoxystyrene and the like, are preferably co-polymerized with methacrylamide and acrylamide monomers.

In one embodiment, the aqueous latex polymer may also comprise vinyl monomers. Monomers of this type suitable for use in accordance with the present invention include any compounds having vinyl functionality, i.e., —CH═$CH_2$ group. Preferably, the vinyl monomers are selected from the group consisting of vinyl esters, vinyl aromatic hydrocarbons, vinyl aliphatic hydrocarbons, vinyl alkyl ethers and mixtures thereof.

Suitable vinyl monomers include vinyl esters, such as, for example, vinyl propionate, vinyl laurate, vinyl pivalate, vinyl nonanoate, vinyl decanoate, vinyl neodecanoate, vinyl butyrates, vinyl caproate, vinyl benzoates, vinyl isopropyl acetates and similar vinyl esters; nitrile monomers, such acrylonitrile, methacrylonitrile and the like; vinyl aromatic hydrocarbons, such as, for example, styrene, methyl styrenes and similar lower alkyl styrenes, chlorostyrene, vinyl toluene, vinyl naphthalene and divinyl benzene; vinyl aliphatic hydrocarbon monomers, such as, for example, vinyl chloride and vinylidene chloride as well as alpha olefins such as, for example, ethylene, propylene, isobutylene, as well as conjugated dienes such as 1,3-butadiene, methyl-2-butadiene, 1,3-piperylene, 2,3-dimethyl butadiene, isoprene, cyclohexene, cyclopentadiene, and dicyclopentadiene; and vinyl alkyl ethers, such as, for example, methyl vinyl ether, isopropyl vinyl ether, n-butyl vinyl ether, and isobutylvinyl ether.

As stated above, the film forming latex particles have a self-crosslinking moiety, so that after the architectural composition is applied to a substrate and the aqueous component evaporates the self-crosslinking moiety crosslinks with a cross-linking agent residing in the aqueous phase. A suitable self-crosslinking moiety is formed by monomers, such as diacetone acrylamide ("DAAM") and suitable cross-linking agents include adipic acid dihydrazide ("ADH").

Such in situ crosslinking gives improved properties over paints or architectural compositions comprising non-crosslinkable polymer. Other suitable crosslinkable monomers, such as diacetone methacrylamide (DAMAM), acetoacetoxyethyl methacrylate (AAEM) and/or allyl methyl acrylate (AMA), can be co-polymerized with film forming monomers to produce self-crosslinkable film forming latex particles.

It has been reported that, the cross-linking of polymers comprising DAAM with ADH cross-linking agent through a keto-hydrazide reaction has a substantial reaction rate in an aqueous solution. ("The diacetone acrylamide cross-linking reaction and its influence on the film formation of an acrylic latex", Journal of Coatings Technology and Research, 5(3), 285-297, 2008.) To minimize this premature cross-linking, the ADH hydrazine is substantially substituted with hydrazone(s) or blocked hydrazine particles discussed in commonly owned United States published patent application No. 2012/0142847 and in commonly owned U.S. Pat. No. 9,040,617, which are incorporated herein by reference in their entireties. The hydrazone crosslinking particles do not react with the DAAM moiety during storage, and are converted to hydrazine crosslinking particles when the aqueous component evaporates after application to a substrate.

Another way to minimize premature cross-linking during storage is to substantially remove the hydrazine (ADH) cross-linking agents and to introduce a second crosslinkable moiety, such as methacrylamide (MAM) and/or acrylamide (AM) monomer, on the latex particles. This second crosslinkable monomer is copolymerized as part of the latex particles and functions as another self-crosslinking moiety to the film forming latex particles. A small amount of hydrazine cross-linking agent, e.g., below its stoichiometric ratio with DAAM, can remain in the aqueous phase. Latex particles with multiple crosslinkable moieties are disclosed in commonly owned United States published patent application Nos. US 2014/0323635, and US 2014/0228514.

Polyurethane powders have been used in powder coating applications for industrial coatings of machine parts. Powder coatings do not utilize solvents and the powders are applied electrostatically. Thereafter, heat is applied to the surfaces to allow the powder to flow/melt to form a skin on the surface. In the present invention, polyurethane spheres or microspheres of certain softness, i.e., Tg less than about 0° C., and certain sizes as specified above, and preferably colorless are added to the aqueous phase of the architectural or paint composition. PU microspheres add softness to the dried paint film and can scatter light. Preferably, the PU microspheres are solid particles and are elastic. Such solid particles can resist breakage due to their elasticity. PU microspheres or particles are commercially available as Decosphaera®, Adimatt®, and Sphaerawet® from Super-Colori in Italy (www.supercolori.com) and are available dispersed in water or as dry beads. PU microspheres are also available from KOBO located in New Jersey and as Art Pearl™ "C" series from Negami Chemical Industrial Co., Ltd. in Japan.

The following experiments were conducted to show the soft feel and light diffusion properties of the inventive architectural or paint compositions. Examples 1-7 relate to the polymerization of the latex particles. Standard emulsion polymerization techniques were being used. Such techniques are disclosed in commonly owned patent nos. and patent application serial nos. or publication nos. U.S. Pat. Nos. 7,642,314; 7,589,158; 7,754,801 C1; 7,547,740; 7,435,777; 2008/0058473; 8,092,909; 8,530,591; 8,733,949; 8,034,871; 2009/0023850; 8,815,981; 8,507,579; 2014/0235752; 2014/0228514; 8,702,862; 8,895,658; 9,115,265;

Ser. No. 14/324,826; and U.S. Pat. No. 9,139,676. These commonly owned references are specifically incorporated herein by reference in their entireties. Preferably, chain transfer agents can be used to control the molecular weight of the latex polymer particles, and the latex particles are all acrylic which may comprise multiple acrylic monomers, described below.

The following abbreviations are used for the monomers in the Examples below.

MAA: methacrylic acid
2-MAOEU: N-(2-Methacryloyloxyethyl) ethylene urea
BA: butyl acrylic
MMA: methyl methacrylate
2-EHA: 2-ethylhexyl acrylate
PPEG: polymerizable PEG (methoxy polyethylene glycol methacrylate, MW 750)
AMA: allyl methyl acrylate (pre-crosslinking monomer)
DAAM: diacetone acrylamide freeze-thaw temperature cycles. Suitable PPEG and PPPG monomers are disclosed in U.S. Pat. Nos. 6,610,776 and 5,610,225, which are incorporated herein by reference in their entireties.

Generally, a PPEG and PPPG can be represented by the formula:

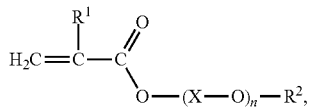

where
$R^1$ is hydrogen or methyl,
—X—O— is a divalent organic alkylene oxide group,
n is an integer ranging from 1 to 50 and
$R^2$ is hydrogen or an aliphatic or aromatic hydrocarbon group having from 1 to 20 carbon atoms. Such general

TABLE 1

Exemplary Acrylic Latex Particles

| Example | Acrylic Monomers (lbs./100 lbs.) | Cross-linking Monomers (lbs./100 lbs.) | Solids (%) | Glass Transition Temperature |
|---|---|---|---|---|
| 1 | MAA (0.55)<br>2-MAOEU (0.98)<br>BA (33.98)<br>MMA (11.47) | DAAM (1.49) | 49.3% | −20° C. |
| 2† | MAA (0.51)<br>2-MAOEU (0.98)<br>BA (31.95)<br>MMA (13.21) | DAAM (1.49)<br>AMA (0.51) | 49.0% | −15.5° C. |
| 3 | Core<br>MAA (0.29)<br>2-MAOEU (0.56)<br>BA (16.65)<br>MMA (4.90)<br>Shell<br>MAA (0.20)<br>2-MAOEU (0.38)<br>BA (19.26)<br>MMA (3.26) | Core<br>DAAM (0.61)<br>AMA (0.51)<br><br><br>Shell<br>DAAM (0.90) | 48.5% | Core<br>−22° C.<br><br><br><br>Shell<br>−32° C. |
| 4‡ | MAA (0.55)<br>2-MAOEU (0.98)<br>BA (16.99)<br>2-EHA (16.99)<br>MMA (11.47) | DAAM (1.49) | 49.3% | −20° C. |
| 5# | MAA (0.55)<br>2-MAOEU (0.98)<br>2-EHA (33.98)<br>MMA (11.47) | DAAM (1.49) | 49.3% | −20° C. |
| 6§ | MAA (0.55)<br>2-MAOEU (0.98)<br>BA (16.99)<br>2-EHA (16.99)<br>MMA (11.47) | DAAM (1.49) | 49.3% | Hi MW core<br>−20° C.<br>Lo MW shell<br>−16.1° C. |
| 7♩ | MAA (0.55)<br>2-MAOEU (0.98)<br>BA (16.99)<br>2-EHA (16.99)<br>MMA (11.47)<br>PPEG (1.25) | DAAM (1.49) | 49.3% | |

†Example 2 has pre-crosslinked core.
‡Example 4 is the same as Example 1 (BA & MMA), but with half of the BA replaced by 2-EHA.
Example 5 is the same as Example 1, but with all of the BA replaced by 2-EHA.
§Example 6 is the same as Example 4 but after 70% of the monomer mix is fed into the reactor, a chain transfer agent and MMA were fed with the remaining 30% or the monomer mix.
♩Example 7 is the same as Example 4 but after 70% of the monomer mix is fed, a polymerizable PEG (750 g/mole) is charged together with the remaining monomer mix.

In example 7, a polymerizable polyethylene glycol (PPEG) or a polypropylene glycol (PPPG) monomer is copolymerized with the principal (e.g., acrylic) monomer to produce emulsion latex particles that are resistance to formula is disclosed the '776 reference, and other general formula is disclosed in the '225 reference, which is equally applicable. A preferred PPEG is methoxy polyethylene glycol methacrylate, MW 750.

Experiments A:

Five paint compositions were prepared without an opacifying pigment or colorants for these experiments. Methods of making paints are fully discussed in the common owned patents and patent applications incorporated by reference above. Examples 8 and 9 utilized a cross-linkable acrylic latex from Examples 1 (with DAAM) and 3 (core/shell with DAAM and AMA in core), respectively. Comparative Examples 10 and 11 are similar to Example 9, except that commercial non-cross-linkable acrylic latexes were used. Comparative Example 12 was prepared with polyurethane latex. Crosslinking agent (ADH) was used in both Examples 8 and 9, and none was used with the Comparative Examples. Preferably, a sufficient amount of cross-linking agent is used in all the examples where such agent is included, e.g., at least the amount to cross-link with the cross-linkable moiety in the latex. A sufficient amount is at least the stoichiometric amount of cross-linking agent, e.g., ADH, to cross-link with the cross-linkable, e.g., moiety DAAM. In one example, the theoretical stoichiometric ratio of ADH (174 g/mole with two reactive groups) to DAAM (169 g/mole with one reactive group) is about 1:2. Experiments have shown that this ratio may be lower because some DAAM monomers would be embedded in the latex particles after copolymerization.

In all Examples 8-12, the Tg of the latexes are reported, as well as the gloss/sheen, touch/feel and scrub cycles for the paint compositions A-F, are reported in Table 2. No opacifying pigment, e.g., $TiO_2$, was used in Examples 8-12. Additives are omitted in the listing of components for clarity, but are included in the total weight.

TABLE 2

Inventive Paints versus Comparative Paints

| COMPONENTS (lbs.) | # 8 | # 9 | # 10 | # 11 | # 12 |
|---|---|---|---|---|---|
| Water | 353 | 353 | 353 | 353 | 168 |
| Example 1 latex (Tg −20° C.) | 250 | | | | |
| Example 3 latex (Tg −22° C. core; Tg −32° C. shell) | | 250 | | | |
| Commercial Acrylic polymer (Tg = −10° C.) | | | 250 | | |
| Commercial Acrylic polymer (Tg = −40° C.) | | | | 250 | |
| Commercial soft feel PU latex | | | | | 630 |
| ADH slurry (intermediate) | 10 | 10 | 0 | 0 | 0 |
| PU microspheres (7 microns dia.) (Tg = −17° C. - by DSC) | 150 | 150 | 150 | 150 | 0 |
| Total weight (lbs.): | 853.04 | 853.04 | 853.04 | 853.04 | |
| Total gallons: | 100 | 100 | 100 | 100 | 100 |
| Gloss @60°/Sheen @85° | 1.3/5.3 | 1.6/7.1 | 2.2/8.9 | 1.9/7 | |
| Touch/Feel | Very soft | Soft | Soft | Soft | |
| Scrub | 970 | 492 | 51 | 40 | |

The results show that paint compositions 8-12 have soft touches and feels. All have low gloss/sheen showing the tight diffusion effects. The paint compositions without ADH or latex without the crosslinking moiety (e.g., DAAM) have low scrub-ability indicating poor crosslinking among the latex particles.

Experiments B:

Another set of experiments was conducted with cross-linkable acrylic latexes and ADH crosslinking agents in the aqueous phase. The latexes are from Examples 1, 4 and 5. Again, no opacifying pigment, e.g., $TiO_2$, was used in Examples 13-17, and these paints are clear base paints, i.e., the colors and hide are provided by the colorants only. Additives are omitted in the listing of components for clarity, but are included in the total weight.

TABLE 3

Inventive Paints with PU microspheres

| Components (lbs.) | #13 | #14 | #15 | #16 | #17 |
|---|---|---|---|---|---|
| PU microspheres (7 microns dia.) (Tg = −17° C. - by DSC) | 120 | 120 | 60 | 60 | 60 |
| Pu microspheres (15 microns dia.) (Tg = −13° C. - by DSC) | 0 | 0 | 60 | 60 | 60 |
| Example 1 latex (Tg −20° C.) | | | 300 | | |
| Example 4 latex (Tg −20° C.) | 300 | | | 300 | |
| Example 5 latex (Tg −20° C.) | | 300 | | | 300 |
| ADH slurry | 10 | 10 | 10 | 10 | 10 |

TABLE 3-continued

| Inventive Paints with PU microspheres | | | | | |
|---|---|---|---|---|---|
| Components (lbs.) | #13 | #14 | #15 | #16 | #17 |
| Water | 378.8 | 378.8 | 378.8 | 378.8 | 378.8 |
| Total weight (lbs): | 854.475 | 854.475 | 854.475 | 854.475 | 854.475 |
| Total gallons: | 100 | 100 | 100 | 100 | 100 |

The mechanical properties of dried films formed from Examples 8-17 and a conventional clear base acrylic paint with no TiO$_2$ or extender pigments are shown below in Table 4.

No. 14/865,704 filed on Sep. 25, 2015, which is incorporated herein by reference in its entirety. Again, additives are omitted in the listing of components for clarity, but are included in the total weight.

TABLE 4

| | Property | | | | | | | | | | |
|---|---|---|---|---|---|---|---|---|---|---|---|
| Latex | #8 Ex. 1 | #9 Ex. 3 | #10 | #11 | #12 | #13 Ex. 4 | #14 Ex. 5 | #15 Ex. 1 | #16 Ex. 4 | #17 Ex. 5 | conv paint |
| Gloss 60/85° | 1.3/5.3 | 1.6/7.1 | 12/8.9 | 1.9/7.0 | 2.0/4.4 | 1.9/5.0 | 1.9/5.5 | 2.1/3.8 | 2.2/3.9 | 2.5/5.4 | 5/18 |
| Water Resistance | 1 | 1 | 1 | 1 | 1 | 5/5 | 5/5 | 5/2 | 5/5 | 5/2 | 5/2 |
| Water Staining | 2 | 1 | 2 | 2 | 3 | 4 | 4 | 4 | 4 | 5 | 3 |
| Flow/Leveling | N/A | N/A | N/A | N/A | 9 | 10 | 10 | 10 | 10 | 10 | 4 |
| TTP stain removal | N/A | N/A | N/A | N/A | N/A | 5 | 5 | 5 | 5 | 5 | 5 |
| Scrub | 953 | 492 | 51 | 40 | 19 | 1480 | 1900 | >2000 | 1560 | >2000 | 1200 |
| Wet adhesion | N/A | N/A | N/A | N/A | 2 | 5 | 5 | 5 | 5 | 5 | 5 |
| Burnishing (% gloss change at 60°) | 0 | N/A | N/A | N/A | N/A | 0 | 5 | 0 | 5.3 | 5.6 | 5.6 |
| Burnishing (% gloss change at 85°) | 54.5 | N/A | N/A | N/A | 53.2 | 7.8 | 21.4 | 9.1 | 9.7 | 9.7 | 42.5 |

Examples 10, 11 and 12 have low Tg latex particles, but do not have cross-linkable latexes, discussed above. The conventional paint does not have the low Tg or soft latex particles. Burnishing is the change in gloss when a brush runs over a dried paint film.

The scrub tests in Table 4 show that unless the soft or low Tg latex particles are cross-linked with a cross-linkable moiety and a crosslinking agent (or blocked crosslinking agent), the paint films do not have the desired mechanical properties. When cross-linked, the inventive paint films have scrub test results similar to those of non-soft conventional paints without low Tg latex. Within the paints with the inventive low Tg latexes, PU microspheres that are cross-linked, paint #9 with core-shell latex has the lowest scrub test result. Paint #9 was formed using the core-shell latex from Example 3, where pre-cross-linking monomer AMA was included in the core. AMA monomer has two-reaction cross-linkable sites to improve resistance to blocking and tackiness and improved elasticity for soft polymers relative to conventional polymers used in interior paints.

The other inventive paints have scrub test results from about 1,000 cycles to about >2,000 cycles, which are at least comparable to and often exceeds the scrub strength of conventional paints. Hence, inventive paints according to the present invention have similar mechanical strengths as conventional paints and are softer to the touch and can diffuse incident light better as shown by the gloss and sheen values and the burnishing values reported in Table 4.

Experiments C.

Three paints, Examples 19-21, were prepared with TiO$_2$ opacifying pigments, as shown in Table 5 below. The amount of TiO2 used in Examples 19-21 is sufficient to make these examples medium base paints. Paint bases are discussed in commonly owned U.S. patent application Ser.

TABLE 5

| Inventive Paints with Opacifying Pigments | | | |
|---|---|---|---|
| COMPONENTS (lbs.) | # 19 | # 20 | # 21 |
| Water | 306.5 | 306.5 | 306.5 |
| Example 1 latex (Tg −20° C.) | 300 | | |
| Example 4 latex (Tg −20° C.) | | 300 | |
| Example 5 latex (Tg −20° C.) | | | 300 |
| TiO$_2$ | 175 | 175 | 175 |
| ADH slurry (intermediate) | 10 | 10 | 10 |
| PU microspheres (7 microns dia.) (Tg = −17° C. - by DSC) | 150 | 150 | 150 |
| Total weight (lbs.): | 984.37 | 984.37 | 984.37 |
| Total gallons: | 100 | 100 | 100 |
| Gloss @60°/Sheen @85° | 3.7/11.7 | 2.5/12.3 | 2.6/12.9 |
| Water sensitivity (7 days) | 4.5 | 4.5 | 4.5 |
| Water staining (7 days) | 3.5 | 4 | 3.5 |
| TTP stain | 5-excellent | 5-excellent | 1-Poor |
| Scrubs | 930-1100 | 679-741 | 682-773 |

The inclusion of opacifying pigments increases the gloss and sheen values and as expected the scrub results decrease. However, the scrub results are still within acceptable range and are comparable to those of conventional paints shown in Table 4. Experiments B and C test the touch/feel properties and scrub-ability of latex #1 (BA and MMA), latex #4 (BA, 2-EHA and MMA) and latex #5 (2-EHA and MMA). In the medium base paints (Table 5, Experiments C), the BA and MMA combination has the highest scrub result, but all three acrylic latex combinations have lower but sufficient scrub-ability than the clear base paints (Table 4, Experiments D with no opacifying pigments). Without being bound to any particular theory, the latex film which incorporates and provides spacing for the opacifying pigments has less structure and continuous phase to resist the scrubs. The scrubability of medium base paints can be improved with changes to the paint formulations.

Among the principal acrylic monomers, 2-EHA is generally more hydrophilic and is softer and has more elasticity than BA or MMA.

The gloss at 60° and sheen at 85° measurements reported in Tables 3 and 4 are in gloss measurement units (GU). These measurements can be carried out with a glossmeter that projects an incident beam of light at the tested surface at a specific angle, i.e., 20°, 60° or 85° from vertical. The incident beam is reflected and is received by an optical detector positioned at about the same angle from vertical and opposite to the incident light. On a glossy or shiny surface, the beam is reflected in a specular manner and would have a high GU value. On a flat or otherwise diffuse surface, the beam is reflected in a diffuse manner and would register a lower GU value. In one example at 60°, a high gloss paint film would have >70 GU; a medium gloss paint film would have between 10 and 70 GU; and a flat paint film would have <10 GU. These exemplary GU values are typical for dry films made from architectural coatings. For highly reflective surfaces such as polished metals and mirrors, the GU values can be greater than 100 GU. Gloss measurements can be carried under ASTM 0346, D523, C584 and D2457, as well as DIN 67530, DIN EN ISO 2813, and EN ISO 7668.

The gloss values at 60° for the clear base paints in Table 4 show that when compared to the conventional clear base acrylic paint, this gloss value of the inventive paints and the comparative uncross-linked soft feel paints are lower. The gloss values at 85° show even more pronounced differences. This shows that the inventive paints provide more light diffusion than commercial flat paints. Preferably, the gloss value for the paint films made from the inventive architectural compositions at 60° is less than about 2.5 GU, preferably less than about 2.3 GU or 2.2 GU and more preferably less than about 2.0 GU for clear base paints. For paints with opacifying pigments, preferably the gloss value at 60° is less than about 5 GU, preferably less than about 4 GU and more preferably less than about 3 GU.

For gloss (or sheen) value at 85°, preferably the gloss value is less than about 7.0 GU, preferably less than about 6.0 GU and more preferably less than about 5.5 GU for clear base paints. For paints with opacifying pigments, preferably the gloss value at 85° is less than about 15 GU, preferably less than about 14 GU and more preferably less than about 13 GU.

In the experiments discussed above, in inventive examples 8-9 the total solid polymers (including acrylic and PU) make up about 31.9% of the total weight and the solid PU microspheres make up about 17.6%. It is noted that Table 1 reports the total solids % for the inventive emulsion latexes. In inventive examples 13-17, the total solid polymers make up about 31.2% of the total weight and the PU microspheres make up about 14.0%. In inventive examples 19-21, the total aqueous polymers make up about 30.2% of the total weight and the PU make up about 15.2% of the total weight.

Table 6 shows the amount of acrylic latex (49% solid) and PU microspheres (100% solids) used in the paints examples above.

TABLE 6

Amounts of Polymer Solids

| Examples | Solid Polymer Content | Weight % | Acrylic/PU |
|---|---|---|---|
| 8-12 clear base (853 lbs. total wt.) | 122.5 lbs. acrylic polymer<br>150 lbs. PU microspheres | 14.4% acryl<br>17.6% PU | 0.817 |
| 13-17 clear base (854.75 lbs. total wt.) | 147 lbs. acrylic polymer<br>120 lbs. PU microspheres | 31.9% total<br>17.2% acryl<br>14.0% PU | 1.225 |
| 19-21 medium base (984 lbs. total wt.) | 147 lbs. acrylic polymer<br>150 lbs. PU microspheres | 31.2% total<br>14.9% acryl<br>15.2% PU<br>30.2% total | 0.98 |

Preferably, the total solid polymer particles in the paint composition make up about 28% to about 40%, more preferably about 29% to about 37.5% or about 30% to about 35% by weight of the paint composition and the PU component makes up from about 10% to about 20% by weight of the paint composition, preferably from about 12% to about 19% and more preferably from about 14% to 18%.

Preferably, the ratio of the PU microspheres to acrylic film-forming polymer is from about 0.6 to about 1.4, more preferably from about 0.7 to about 1.3 or from about 0.8 to about 1.25.

Experiments D.

Two paint samples, Examples 22 and 23, are prepared similar to Example 14 with the latexes from Example 5. Except that in Example 22 a same amount (120 lbs.) of 2-micron (weight average) silicone elastomer microspheres replaced the 7-micron PU microspheres. Also in Example 23, a same amount of solid cross-linked polybutylacrylate elastomer microspheres (350 lbs. at 34.2% solid to yield 120 lbs. of solid BA spheres) having a weight average diameter of about 8 microns was used instead of the 7-micron PU microspheres. Table 7 shows the mechanical properties of Examples 22 and 23

TABLE 7

|  | Ex. 22 | Ex. 23 |
|---|---|---|
| Gloss 60°/85° | 1.7/2.5 | 5.5/20.9 |
| Water sensitivity (7 days) | 1 | 2 |
| Water staining (7 days) | 4 | 4 |
| Scrubs | n/a | 1107 |

Example 22 has poor scrub result, which was probably caused by the tackiness of the silicone beads in the paint and did not exhibit the same soft feel. Example 23, however, is presently viable, and polybutylacrylate beads can be used in the present invention.

While it is apparent that the illustrative embodiments of the invention disclosed herein fulfill the objectives stated above, it is appreciated that numerous modifications and other embodiments may be devised by those skilled in the art. One such modification is that other latex particles, such as vinyl acrylic or styrene, and other microspheres with similar Tg as the PU microspheres can be used with the present invention. Therefore, it will be understood that the appended claims are intended to cover all such modifications and embodiments, which would come within the spirit and scope of the present invention.

We claim:

1. An aqueous architectural composition comprising
an substantially acrylic emulsion polymer wherein the acrylic monomers forming the polymer have a Tg of less than about −10° C. and higher than about −50° C., wherein the acrylic emulsion polymer comprises at least one cross-linkable moiety;
a plurality of solid polyutherane (PU) spheres having a mean weight diameter of less than about 40 microns and a Tg of less than about 0° C., wherein the solid PU spheres make up about 10% to about 20% by weight of the composition, wherein the substantially acrylic emulsion polymer forms a film and wherein the plurality of solid PU spheres do not form a film; and
a sufficient amount of cross-linking agent in the aqueous phase of the composition to cross-link with the at least one cross-linkable moiety.

2. The aqueous architectural composition of claim 1, wherein the acrylic polymer without water and the PU spheres make up about 30% to about 40% by weight of the aqueous composition.

3. The aqueous architectural composition of claim 1, wherein the solid PU spheres make up about 12% to about 18% by weight of the aqueous composition.

4. The aqueous architectural composition of claim 3, wherein the solid PU spheres make up about 14% to about 18% by weight of the aqueous composition.

5. The aqueous architectural composition of claim 1, wherein the acrylic monomers have a Tg of less than about −15° C.

6. The aqueous architectural composition of claim 1, wherein the acrylic monomers have a Tg of less than about −20° C.

7. The aqueous architectural composition of claim 1, wherein the acrylic monomers have a Tg of less than about −25° C.

8. The aqueous architectural composition of claim 1, wherein the mean weight diameter of the PU spheres is from about 5 microns to about 20 microns.

9. The aqueous architectural composition of claim 8, wherein the mean weight diameter of the PU spheres is from about 7 microns to about 17 microns.

10. The aqueous architectural composition of claim 9, wherein the mean weight diameter of the PU spheres is from about 7 microns to about 15 microns.

11. The aqueous architectural composition of claim 1, wherein the mean weight diameter of the PU spheres is about 20 microns to about 40 microns.

12. The aqueous architectural composition of claim 11, wherein the mean weight diameter of the PU spheres is from about 25 microns to about 35 microns.

13. The aqueous architectural composition of claim 1, wherein the mean weight diameter of the PU spheres comprises a first mean weight average diameter from about 5 microns to about 15 microns, and a second mean weight average diameter from about 25 microns to about 35 microns.

14. The aqueous architectural composition of claim 1, wherein the substantially acrylic emulsion polymer comprises a polymerizable polyethylene glycol monomer or a polymerizable polypropylene glycol monomer.

15. The aqueous architectural composition of claim 1, wherein the substantially acrylic emulsion polymer comprises a methoxy polyethylene glycol methacrylate monomer.

16. The aqueous architectural composition of claim 1, wherein the substantially acrylic emulsion polymer is selected from a group consisting of butyl acrylic and methyl methacrylate; butyl acrylic, 2-ethylhexyl acrylate and methyl methacrylate, and 2-ethylhexyl acrylate and methyl methacrylate.

17. The aqueous architectural composition of claim 1, wherein the at least one cross-linkable moiety comprises a diacetone acrylamide ("DAAM") monomer, a diacetone methacrylamide (DAMAM) monomer, an acetoacetoxyethyl methacrylate (AAEM) monomer or an allyl methyl acrylate (AMA) monomer.

18. The aqueous architectural composition of claim 1, wherein the cross-linking agent in the aqueous phase of the composition comprises adipic acid dihydrazide ("ADH").

19. The aqueous architectural composition of claim 1, wherein the cross-linking agent in the aqueous phase of the composition comprises a hydrazone or a blocked hydrazine.

20. The aqueous architectural composition of claim 1, wherein a ratio of the substantially acrylic emulsion polymer to PU spheres is from about 0.6 to about 1.4.

21. The aqueous architectural composition of claim 1, wherein said sufficient amount of cross-linking agent to cross-link with the at least one cross-linkable moiety comprises at least a stoichiometric amount.

22. A dried paint film formed by the aqueous architectural composition of claim 1 that can withstand at least about 500 cycles on the scrub test.

23. A dried paint film formed by the aqueous architectural composition of claim 1 that has a gloss value at 60° of less than about 2.5 GU.

24. An aqueous architectural composition comprising
an substantially acrylic emulsion polymer wherein the acrylic monomers forming the polymer have a Tg of less than about −10° C. and higher than about −50° C., wherein the acrylic emulsion polymer comprises at least one cross-linkable moiety;
a plurality of solid polybutylacrylate spheres having a mean weight diameter of less than about 40 microns and a Tg of less than about 0° C., wherein the solid polybutylacrylate spheres make up about 10% to about 20% by weight of the composition, wherein the substantially acrylic emulsion polymer forms a film and wherein the plurality of solid polybutulacrylate spheres do not form a film; and
a sufficient amount of cross-linking agent in the aqueous phase of the composition to cross-link with the at least one cross-linkable moiety.

* * * * *

UNITED STATES PATENT AND TRADEMARK OFFICE
CERTIFICATE OF CORRECTION

PATENT NO. : 10,040,966 B2
APPLICATION NO. : 15/147938
DATED : August 7, 2018
INVENTOR(S) : Yong Yang et al.

Page 1 of 1

It is certified that error appears in the above-identified patent and that said Letters Patent is hereby corrected as shown below:

In the Claims

Claim 1 should read:
1. An aqueous architectural composition comprising
an substantially acrylic emulsion polymer wherein the acrylic monomers forming the polymer have a Tg of less than about $-10°$ C. and higher than about $-50°$ C., wherein the acrylic emulsion polymer comprises at least one cross-linkable moiety;
a plurality of solid polyurethane(PU) spheres having a mean weight diameter of less than about 40 microns and a Tg of less than about $0°$ C., wherein the solid PU spheres make up about 10% to about 20% by weight of the composition, wherein the substantially acrylic emulsion polymer forms a film and wherein the plurality of solid PU spheres do not form a film; and
a sufficient amount of cross-linking agent in the aqueous phase of the composition to cross-link with the at least one cross-linkable moiety.

Signed and Sealed this
Sixteenth Day of June, 2020

Andrei Iancu
*Director of the United States Patent and Trademark Office*